United States Patent
Baladhandapani et al.

(10) Patent No.: US 11,670,183 B2
(45) Date of Patent: Jun. 6, 2023

(54) SYSTEMS AND METHODS FOR CONTEXTUAL ALERTS DURING GROUND OPERATIONS

(71) Applicant: HONEYWELL INTERNATIONAL INC., Morris Plains, NJ (US)

(72) Inventors: Gobinathan Baladhandapani, TamilNadu (IN); Narayanan Srinivasan, TamilNadu (IN); Hariharan Saptharishi, Tamilnadu (IN); Raghupathy P, Karnataka (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 377 days.

(21) Appl. No.: 16/134,305

(22) Filed: Sep. 18, 2018

(65) Prior Publication Data

US 2020/0090531 A1   Mar. 19, 2020

(51) Int. Cl.
*G08G 5/06* (2006.01)
*G10L 15/26* (2006.01)
(Continued)

(52) U.S. Cl.
CPC .......... *G08G 5/065* (2013.01); *G08G 5/0026* (2013.01); *G08G 5/0043* (2013.01); *G10L 15/22* (2013.01); *G10L 15/26* (2013.01)

(58) Field of Classification Search
CPC .... G08G 5/065; G08G 5/0026; G08G 5/0043; G10L 15/22; G10L 15/265
See application file for complete search history.

(56) References Cited

U.S. PATENT DOCUMENTS

| 5,043,929 A * | 8/1991 | Kramer | G06F 30/17 |
| | | | 703/1 |
| 7,117,089 B2 * | 10/2006 | Khatwa | G08G 5/065 |
| | | | 340/471 |

(Continued)

FOREIGN PATENT DOCUMENTS

| CN | 105321377 A | 2/2016 |
| EP | 2887337 A1 | 6/2015 |

OTHER PUBLICATIONS

"Problematic Taxiway Geometry Study Overview" 47pages:available @ https://www.airporttech.tc.faa.gov/Products/Airport-Safety-Papers-Publications/Airport-Safety-Detail/ArtMID/3682/ArticleID/157/Problematic-Taxiway-Geometry-Study-Overview : last accessed Feb. 10, 2021 (Year: 2018).*

*Primary Examiner* — Hunter B Lonsberry
*Assistant Examiner* — Daniel L Greene
(74) *Attorney, Agent, or Firm* — Lorenz & Kopf LLP

(57) ABSTRACT

Systems and methods for contextual alerts during ground operations are provided. The system generates unique alerts for each type of hot-spot and commands a display system to render an image of the route, the relevant signage features, and the hot-spots. The system receives an assigned runway and references an airport features database to construct a route and travel direction for the aircraft. The system analyzes the signage features associated with the route and identifies the relevant signage features. The system processes the route with external inputs, such as notices to airmen (NOTAM), traffic data, and novel rules and data tables, from which the system identifies various kinds of hot-spots. The hot-spots include those that are aerodrome design based, those that are traffic related, and those that are temporal, based on short term closures or operational scenarios.

13 Claims, 5 Drawing Sheets

(51) Int. Cl.
*G08G 5/00* (2006.01)
*G10L 15/22* (2006.01)

(56) References Cited

U.S. PATENT DOCUMENTS

| | | |
|---|---|---|
| 7,307,578 B2 | 12/2007 | Blaskovich et al. |
| 7,567,187 B2 | 7/2009 | Ramaiah et al. |
| 7,693,621 B1 * | 4/2010 | Chamas ............... G08G 5/0021 340/951 |
| 8,396,616 B1 | 3/2013 | Barber et al. |
| 8,594,916 B2 * | 11/2013 | He ...................... G01C 23/005 340/972 |
| 8,694,237 B1 * | 4/2014 | Romine, III ........... G08G 5/065 701/301 |
| 8,788,187 B2 | 7/2014 | Doose et al. |
| 9,171,374 B2 | 10/2015 | Tadmor |
| 9,202,380 B1 | 12/2015 | Shapiro et al. |
| 9,262,927 B2 * | 2/2016 | Populus ............... G08G 5/0013 |
| 9,487,304 B1 | 11/2016 | Bowen et al. |
| 9,517,844 B2 | 12/2016 | Khatwa et al. |
| 9,583,005 B2 * | 2/2017 | Kommuri ............ G08G 5/0091 |
| 9,718,558 B2 | 8/2017 | Ball et al. |
| 10,290,217 B1 * | 5/2019 | Ramachandra ......... G08G 5/065 |
| 2003/0093187 A1 * | 5/2003 | Walker ............... B64D 45/0059 701/1 |
| 2005/0085959 A1 | 4/2005 | Feyereisen |
| 2007/0088491 A1 | 4/2007 | He |
| 2010/0250030 A1 * | 9/2010 | Nichols ................ G01C 23/005 701/7 |
| 2011/0196598 A1 | 8/2011 | Feyereisen et al. |
| 2012/0021740 A1 * | 1/2012 | Vaidyanathan ...... G08G 5/0013 455/431 |
| 2012/0158277 A1 | 6/2012 | Gayraud et al. |
| 2013/0113819 A1 * | 5/2013 | Gurusamy ........... G08G 5/0021 345/592 |
| 2013/0231853 A1 | 9/2013 | Feyereisen et al. |
| 2014/0354456 A1 | 12/2014 | Gannon et al. |
| 2015/0239574 A1 * | 8/2015 | Ball ....................... G01C 23/00 701/3 |
| 2016/0063869 A1 * | 3/2016 | Kathirvel ............. G08G 5/0008 701/3 |
| 2017/0083206 A1 * | 3/2017 | He ....................... G08G 5/0021 |
| 2018/0061243 A1 * | 3/2018 | Shloosh ............... G08G 5/0021 |
| 2018/0233052 A1 | 8/2018 | Shamasundar et al. |

* cited by examiner

SYSTEMS AND METHODS FOR CONTEXTUAL ALERTS DURING GROUND OPERATIONS

TECHNICAL FIELD

The technical field generally relates to navigational aids, and more particularly relates to systems and methods for providing contextual alerts during ground operations.

BACKGROUND

Runway incursions are undesirable events that have the potential to occur during ground operations. After numerous studies concluded that problematic taxiway/runway geometry was a contributing factor in many runway incursions, the 2012 release of Federal Aviation Administration (FAA) Advisory Circular (AC) 150/5300-13A, "Airport Design," included new guidance for airport design. The FAA Office of Airports, Airport Engineering Division, requested the Airport Technology Research and Development Branch to conduct additional research into taxiway geometry as the basis of a 10- to 15-year improvement program to identify and correct high-incident areas on airport taxiways/runways. The resulting study consisted of developing a geographic information system (GIS) database inventory of reported runway incursions and problematic taxiway geometry (PTG) locations and areas currently designated as hot spots. This database has been used for contextual alerting during ground operations.

The above described GIS database includes an inventory of pilot deviation (PD) and vehicle/pedestrian deviation (V/PD) runway incursions that occurred at National Plan of Integrated Airport Systems (NPIAS)-towered airports reported from Oct. 1, 2007 (when the current definition of runway incursions was adopted) to Sep. 30, 2013. Therefore, while this database is helpful guidance, updated and additional improvements to contextual alerting during ground operations are desired.

Accordingly, improved systems and methods for contextual alerting during ground operations are desirable. The desirable contextual alert system identifies aerodrome design issues that may contribute to hot spots, and utilizes a novel method to display relevant airport signage and symbols on an airport moving map. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An embodiment of a system for contextual alerts during ground operations is provided. The system includes: a source of airport feature data associated with an airport field; a source of navigation data including a current location and heading of an aircraft; a source of an assigned runway; a source of traffic data; and a control module operationally coupled to the source of airport feature data, the source of navigation data, the source of the assigned runway, and the source of traffic data, the control module configured to: receive the assigned runway; construct, using airport feature data, a route for the aircraft to travel from its current location to the assigned runway, the route including a travel direction; generate display commands for rendering an image showing the aircraft at the current location and heading on the airport field; analyze the route to identify relevant signage features, defined as signage features associated with the route; generate display commands for concurrently rendering, on the image, the relevant signage features with a visual emphasis that provides visual distinguishability with respect to the remaining signage features; identify hot-spots on the route, defined as processing the route with (i) the traffic data to determine whether there is a traffic hot-spot, and (ii) problematic scenarios to determine whether there is a design hot-spot; and generate a traffic hot-spot alert when the hot-spot is a traffic hot-spot; generate a design hot-spot alert when the hot-spot is a design hot-spot; and generate display commands for rendering the respective hot-spot alerts on the image; and a display system operationally coupled to the control module and configured to render the images responsive to received display commands.

Also included is a method for contextual alerts during ground operations. The method includes: at a control module comprising a processor and a memory, receiving, from a navigation system, a current location and heading for an aircraft; receiving, from an external source, an assigned runway; referencing airport feature data to construct a route for the aircraft to travel from the current location to the assigned runway, the route including a travel direction; generating display commands for rendering an image showing the aircraft at the current location and heading on the airport field; analyzing the route to identify relevant signage features, defined as signage features associated with the route; and generating display commands for concurrently rendering, on the image, the relevant signage features with a visual emphasis that provides visual distinguishability with respect to the remaining signage features; identifying hot-spots on the route, defined as processing the route with (i) received traffic data to determine whether there is a traffic hot-spot, and (ii) a problematic scenarios list to determine whether there is a design hot-spot; and generating a traffic hot-spot alert when the hot-spot is a traffic hot-spot; generating a design hot-spot alert when the hot-spot is a design hot-spot; and generating display commands for rendering the respective hot-spot alerts on the image; and at a display system, receiving the display commands and rendering images responsive to the received display commands.

In another embodiment, a control module for an aircraft during ground operations, the aircraft comprising a source of navigation data including a current location and heading of an aircraft, and a source of airport feature data associated with an airport field is provided. The control module includes: a memory; a database including a problematic scenarios listing; and a processor operationally coupled to the memory and the database, the processor configured to: receive an assigned runway; construct, using airport feature data, a route for the aircraft to travel from its current location to the assigned runway, the route including a travel direction; generate display commands for rendering an image showing the aircraft at the current location and heading on the airport field; analyze the route to identify relevant signage features, defined as signage features associated with the route; generate display commands for concurrently rendering, on the image, the relevant signage features with a visual emphasis that provides visual distinguishability with respect to the remaining signage features; identify hot-spots on the route, defined as processing the route with (i) the traffic data to determine whether there is a traffic hot-spot, and (ii) problematic scenarios to determine whether there is a design hot-spot; and generate a traffic hot-spot alert when the hot-spot is a traffic hot-spot; generate a design hot-spot alert when the hot-spot is a design hot-spot; and generate display commands for rendering the respective hot-spot alerts on the image.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

As mentioned, it is desirable to update and improve upon the available database of PTG locations and areas. Further analysis on each PTG location included in the GIS included assigning an incident category based on the peak number of annual associated incidents. The PTGs with high incidents per year were analyzed to further identify geometries and scenarios of concern. As a result of this further analysis, "complex or inadequate aerodrome design" was cited as one of the significant factors increasing the probability of incidents of runway incursions. Identifying and alerting for these various "complex or inadequate aerodrome design" issues that result in hot-spots is a technical problem to address.

Exemplary embodiments provide a technical solution to this problem in the form of a control module (FIG. 1, 102) embodying novel rules and aerodrome design factors known to cause problems. The disclosed problematic scenarios listing provides definitions and thresholds to identify various types of "complex or inadequate aerodrome design" issues. The disclosed control module operates on available input and the problematic scenarios database to prioritize, according to context, signage and alerting for a ground operation. The disclosed control module further evaluates hot-spots based on traffic, and identifies temporal hot-spots, as reported by various external sources. The figures and descriptions below provide more detail.

Figure 1:
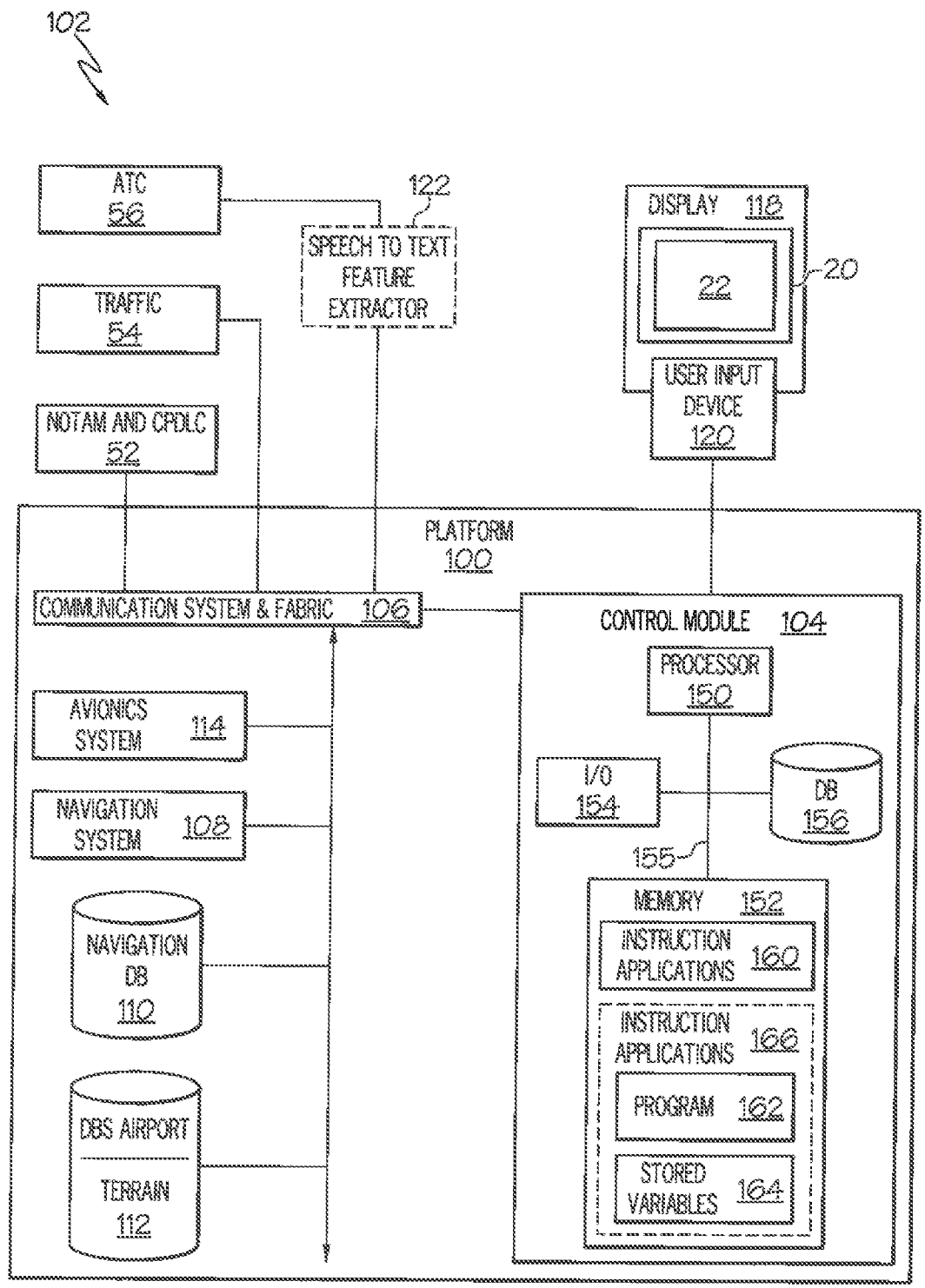
FIG. 1 is a block diagram of a system for contextual alerts, in accordance with an exemplary embodiment.

Turning now to FIG. 1, in an embodiment, the system for contextual alerts 102 (also referred to herein as "system" 102) is generally associated with a mobile platform 100. In various embodiments, the mobile platform 100 is an aircraft, and is referred to as aircraft 100. The system 102 embodies a control module 104. In some embodiments, the control module 104 may be integrated within a preexisting mobile platform management system, avionics system, cockpit display system (CDS), flight controls system (FCS), or aircraft flight management system (FMS). Although the control module 104 is shown as an independent functional block, onboard the aircraft 100, in other embodiments, it may exist in an electronic flight bag (EFB) or portable electronic device (PED), such as a tablet, cellular phone, or the like. In embodiments in which the control module is within an EFB or a PED, the display system 118 and user input device 120 may also be part of the EFB or PED.

The control module 104 may be operationally coupled to any combination of the following aircraft systems: a communication system and fabric 106; a source of real-time aircraft state data, such as a navigation system 108; a source of prescribed flight plan data, such as a navigation database (NavDB 110); one or more databases 112; a display system 118; and a user input device 120. The control module 104 is communicatively coupled to a source of notice to airmen (NOTAM 52) data, air traffic control 56, and a source of traffic data 54, such as automatic dependent surveillance broadcast (ADS-B) and traffic information service broadcast (TIS-B). In various embodiments, the control module 104 is additionally operationally coupled to one or more avionics systems 114, and a speech to text converter/features extractor 122. The functions of these aircraft systems, and their interaction, are described in more detail below.

Real-time aircraft state data may include any of: an instantaneous location (e.g., the latitude, longitude, orientation), an instantaneous heading (i.e., the direction the aircraft is traveling in relative to some reference), a flight path angle, a vertical speed, a ground speed, an instantaneous altitude (or height above ground level), and a current phase of flight of the aircraft 100. As used herein, "real-time" is interchangeable with current and instantaneous. In some embodiments, the real-time aircraft state data is generated by the navigation system 108. The navigation system 108 may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS, as will be appreciated in the art. The data provided by the navigation system 108 is referred to as navigation data (also referred to herein as the real-time aircraft state data). The real-time aircraft state data is made available, generally by way of the communication system and fabric 106, so other components, such as the control module 104 and the display system 118, may further process and/or handle the aircraft state data.

Prescribed flight plan (FP) data may include a series of intended geospatial midpoints between a departure and an arrival, as well as performance data associated with each of the geospatial midpoints (non-limiting examples of the performance data include intended navigation data, such as: intended airspeed, intended altitude, intended acceleration, intended flight path angle, and the like). A source of a prescribed flight plan data may be a storage location or a user input device. In various embodiments, the navigation database, NavDB 110, is the source of a prescribed flight plan. The navigation database (NavDB 110) is a storage location that may also maintain a database of flight plans, and/or information regarding terrain and airports and/or other potential landing locations (or destinations) for the aircraft 100.

In various embodiments, the avionics systems 114 provide aircraft performance data and sensed data for a variety of aircraft 100 subsystems. Examples of the aircraft performance data include: engine thrust level, fuel level, flap configuration, braking status, temperature control system status, and the like. As may be appreciated, the avionics systems 114 may therefore include a variety of on-board detection sensors and may be operationally coupled to the control module 104, central management computer, or FMS.

The communications system and fabric 106 is configured to support instantaneous (i.e., real time or current) communications between onboard systems (i.e., the navigation system 108, the navigation database 110, the database 112, and the avionics systems 114), the control module 104, and the one or more external data source(s). As a functional block, the communications system and fabric 106 represents one or more transmitters, receivers, and the supporting communications hardware and software required for components of the system 102 to communicate as described herein. In various embodiments, the communications system and fabric 106 may have additional communications not directly relied upon herein, such as bidirectional pilot-to-ATC (air traffic control) communications via a datalink; support for an automatic dependent surveillance broadcast system (ADS-B); a communication management function (CMF) uplink; a terminal wireless local area network (LAN) unit (TWLU); an instrument landing system (ILS); and, any other suitable radio communication system that supports communications between the aircraft 100 and the various external source(s). In various embodiments, the control module 104 and communications system and fabric 106 also support controller pilot data link communications (CPDLC) with CPDLC 52, such as through an aircraft communication addressing and reporting system (ACARS) router; in various embodiments, this feature may be referred to as a communications management unit (CMU) or communications management function (CMF). In summary, the communications system and fabric 106 may allow the aircraft 100 and the control module 104 to receive information that would otherwise be unavailable to the pilot and/or co-pilot using only the onboard systems.

External sources communicate with the aircraft 100 and the control module 104, generally, by way of the communication system and fabric 106. External sources include: NOTAM 52 (which includes CPDLC 52), traffic data system(s) 54; air traffic control (ATC) 56; and a variety of other radio inputs, such as source(s) of the radio signals used by the an instrument landing system (ILS), and weather and surface data sources, such as a source for meteorological terminal aviation weather reports (METARS), automatic terminal information service (ATIS), datalink ATIS (D-ATIS), automatic surface observing system (ASOS). The traffic data system(s) 54 include numerous systems for providing real-time neighbor/relevant traffic data and information. For example, traffic data sources 54 may include any combination of: traffic collision avoidance system (TCAS), automatic dependent surveillance broadcast (ADS-B), traffic information system (TIS), crowd sourced traffic data and/or another suitable avionics system. Flight traffic information that is received from the traffic data system may include, for each neighbor aircraft of a plurality of neighbor aircraft, one or more of a respective instantaneous location and heading, vertical speed, ground speed, instantaneous altitude, and aircraft identification.

The user input device 120 and the control module 104 are cooperatively configured to allow a user (e.g., a pilot, co-pilot, or crew member) to interact with display devices in the display system 118 and/or other elements of the system 102, as described in greater detail below. Depending on the embodiment, the user input device 120 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 120 is configured as a touchpad or touchscreen, it may be integrated with the display system 118. As used herein, the user input device 120 may be used by a pilot to communicate with ATC 56, to modify or upload the program product 166, etc. In various embodiments, the display system 118 and user input device 120 are onboard the aircraft 100 and are also operationally coupled to the communication system and fabric 106. In some embodiments, the control module 104, user input device 120, and display system 118 are configured as a control display unit (CDU).

In various embodiments, the control module 104, alone, or as part of a central management computer (CMS) or a flight management system (FMS), draws upon data and information from the navigation system 108 and the NavDB 110 to provide real-time flight guidance for aircraft 100. The real time flight guidance may be provided to a user by way of commands for the display system 118, an audio system, or the like. For example, the control module 104 may compare an instantaneous position and heading of the aircraft 100 with the prescribed flight plan data for the aircraft 100 and generate display commands to render images 22 showing these features. The control module 104 may further associate a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like) with the instantaneous position and heading of the aircraft 100 and/or with the navigation plan for the aircraft 100.

The control module 104 generates display commands for the display system 118 to cause the display device 20 to render thereon the image 22, comprising various graphical user interface elements, tables, icons, alerts, menus, buttons, and pictorial images, as described herein. The display system 118 is configured to continuously receive and process the display commands from the control module 104. The display system 118 includes a display device 20 for presenting an image 22. In various embodiments described herein, the display system 118 includes a synthetic vision system (SVS), and the image 22 is a SVS image. In exemplary embodiments, the display device 20 is realized on one or more electronic display devices configured as any combination of: a head up display (HUD), an alphanumeric display, a vertical situation display (VSD) and a lateral navigation display (ND).

Renderings on the display system 118 may be processed by a graphics system, components of which may be integrated into the display system 118 and/or be integrated within the control module 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes. In an embodiment, the Bokeh effect is used for emphasizing relevant signage with respect to remaining signage. The control module 104 may be said to display various images and selectable options described herein. In practice, this may mean that the control module 104 generates display commands, and, responsive to receiving the display commands from the control module 104, the display system 118 displays, renders, or otherwise visually conveys on the display device 20, the graphical images associated with operation of the aircraft 100, and specifically, the graphical images as directed by the control module 104.

In addition to providing flight guidance, in various embodiments, any combination of the control module 104, user input device 120, avionics systems 114, and communication system and fabric 106, may be coupled to the display system 118 such that the display system 118 may additionally generate or render, on the display device 20, real-time avionics systems information associated with respective aircraft 100 systems and components.

In various embodiments, the control module 104 is additionally operationally coupled to one or more databases 112. The databases 112 may include one or more of: a runway awareness and advisory system (RAAS) database and an Aerodrome Mapping Database (AMDB). In various embodiments, each of these may include an airport features database, having therein maps and geometries, including runway records with corresponding runway threshold locations. The AMDB may also include airport status data for the runways and/or taxi paths at the airport; the airport status data indicating operational status and directional information for the taxi paths (or portions thereof). In some embodiments, the databases 112 may include a terrain database, having therein topographical information for the airport and surrounding environment.

The control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the control module 104 is depicted as a computer system including a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Specifically, the memory 152 stores instructions and applications 160. Information in the memory 152 may be organized and/or imported from an external data source 50 during an initialization step of a process; it may also be programmed via a user input device 120. During operation, the processor 150 loads and executes one or more programs, algorithms and rules embodied as instructions and applications 160 contained within the memory 152 and, as such, controls the general operation of the control module 104 as well as the system 102.

The novel program 162 includes rules and instructions which, when executed, convert the processor 150/memory 152/database 156 configuration into the control module 104, which is a novel "contextual alerts" control module that performs the functions, techniques, and processing tasks associated with the operation of the system 102. Novel program 162 and associated stored variables 164 may be stored in a functional form on computer readable media, for example, as depicted, in memory 152. While the depicted exemplary embodiment is described in the context of a fully functioning computer system, those skilled in the art will recognize that the mechanisms of the present disclosure are capable of being distributed as a program product 166. As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

In executing the process described herein, the processor 150 specifically loads the instructions embodied in the program 162, thereby being programmed with program 162. During execution of program 162, the processor 150, the memory 152, and a database DB 156 form a novel dynamic processing engine that performs the processing activities of the system 102.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the communication system and fabric 106. The I/O interface 154 may include one or more network interfaces and can be implemented using any suitable method and apparatus. In various embodiments, the I/O interface 154 is configured to support communication from an external system driver and/or another computer system. In one embodiment, the I/O interface 154 is integrated with the communication system and fabric 106 and obtains data from external data source(s) directly. Also, in various embodiments, the I/O interface 154 may support communication with technicians, and/or one or more storage interfaces for direct connection to storage apparatuses, such as the database 156.

In some embodiments, the database 156 is part of the memory 152. In various embodiments, the database 156 and the database 112 are integrated, either within the control module 104 or external to it. Accordingly, in some embodiments, the airport features data and terrain features are pre-loaded and internal to the control module 104. The database 156 includes a novel problematic scenarios database (comprising specifically identified problematic geometries and scenarios) and parameters and instructions for processing user inputs and rendering images 22 on the display device 20, as described herein. Examples of potential problematic scenarios are listed in Table 1. This listing may be updated as needed or as scheduled, for example, via user input device 120. Items that are descriptive are understood to have corresponding geometric definitions, such as widths, lengths, a threshold for defining a wide expanse of pavement, a threshold defining close proximity, etc. The variables and parameters are stored in stored variables 164.

TABLE 1

Problematic Scenarios Listing

Y-shaped taxiways crossing a runway
Wrong runway events
Wide expanses of taxi pavements entering or along a runway
Convergence of numerous taxiway types entering a runway
High-speed exit crossing a taxiway
Two runway thresholds in close proximity
Short taxiways (stubs) between runways
Direct taxiing access to runways from ramp areas
An aligned taxiway entering runway ends
Nonstandard markings and/or signage placement
(e.g., overlapping holdbars, nonstandard holdbar placement, runway intersections with multiple hold lines)
Greater than three-node taxiway intersection
Taxiway connection to V-shaped runways
Taxiway intersects runway at other than a right angle
Short taxi distance from ramp/apron area to a runway
High-speed exits leading directly onto another runway
Taxiway coinciding with the intersection of two runways
Using a runway as a taxiway
Unexpected holding position marking on parallel/entrance taxiway As is described in more detail below, after constructing a route the aircraft 100 will use for ground operations, the control module 104 processes the route with the problematic scenarios listing to identify potential hot-spots related thereto. These hot-spots are referred to herein as design hot-spots.

Figure 2:
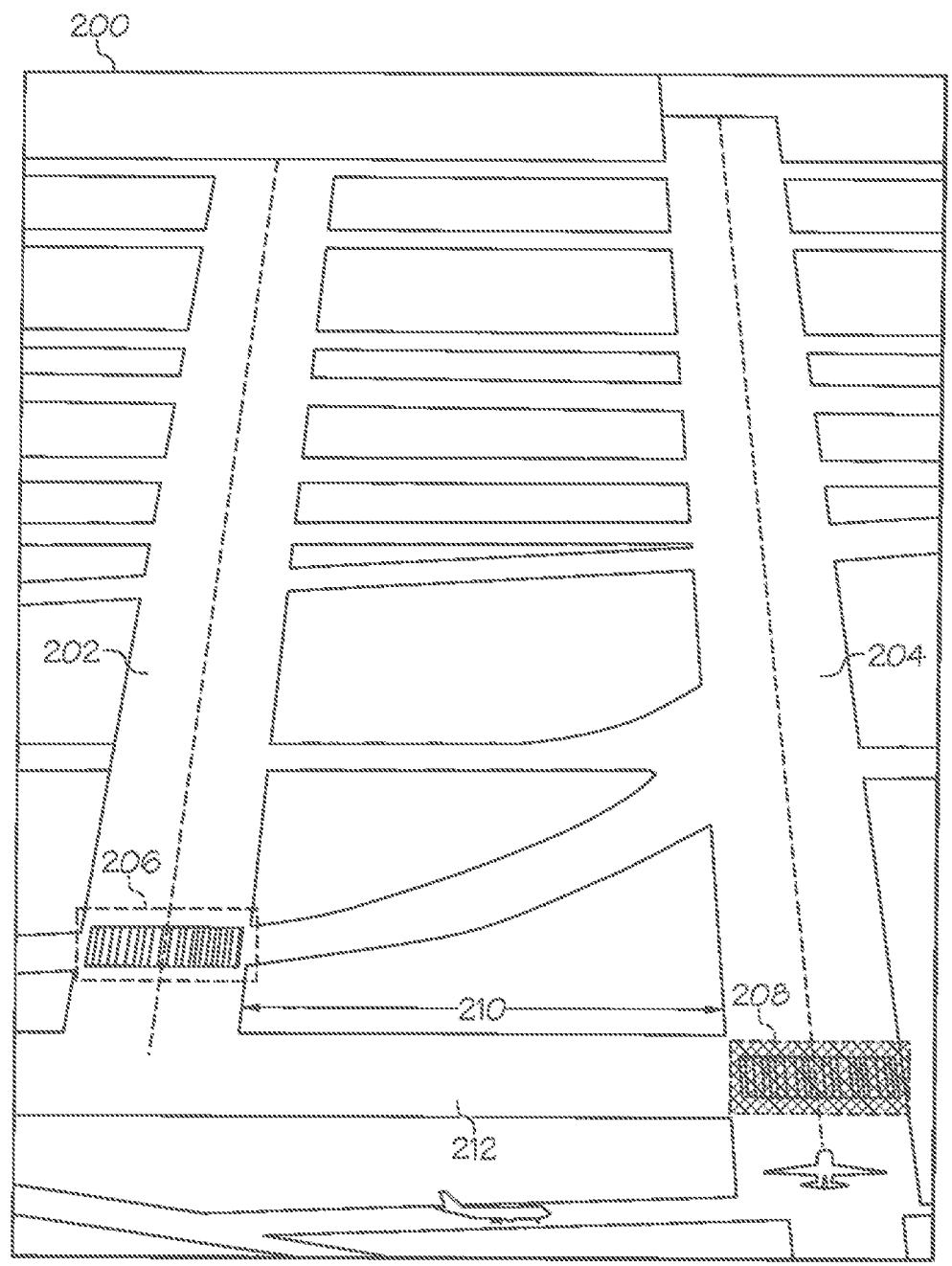
FIGS. 2-4 are illustrations showing several applications of the system for contextual alerts, in accordance with an exemplary embodiment.
Figure 3:
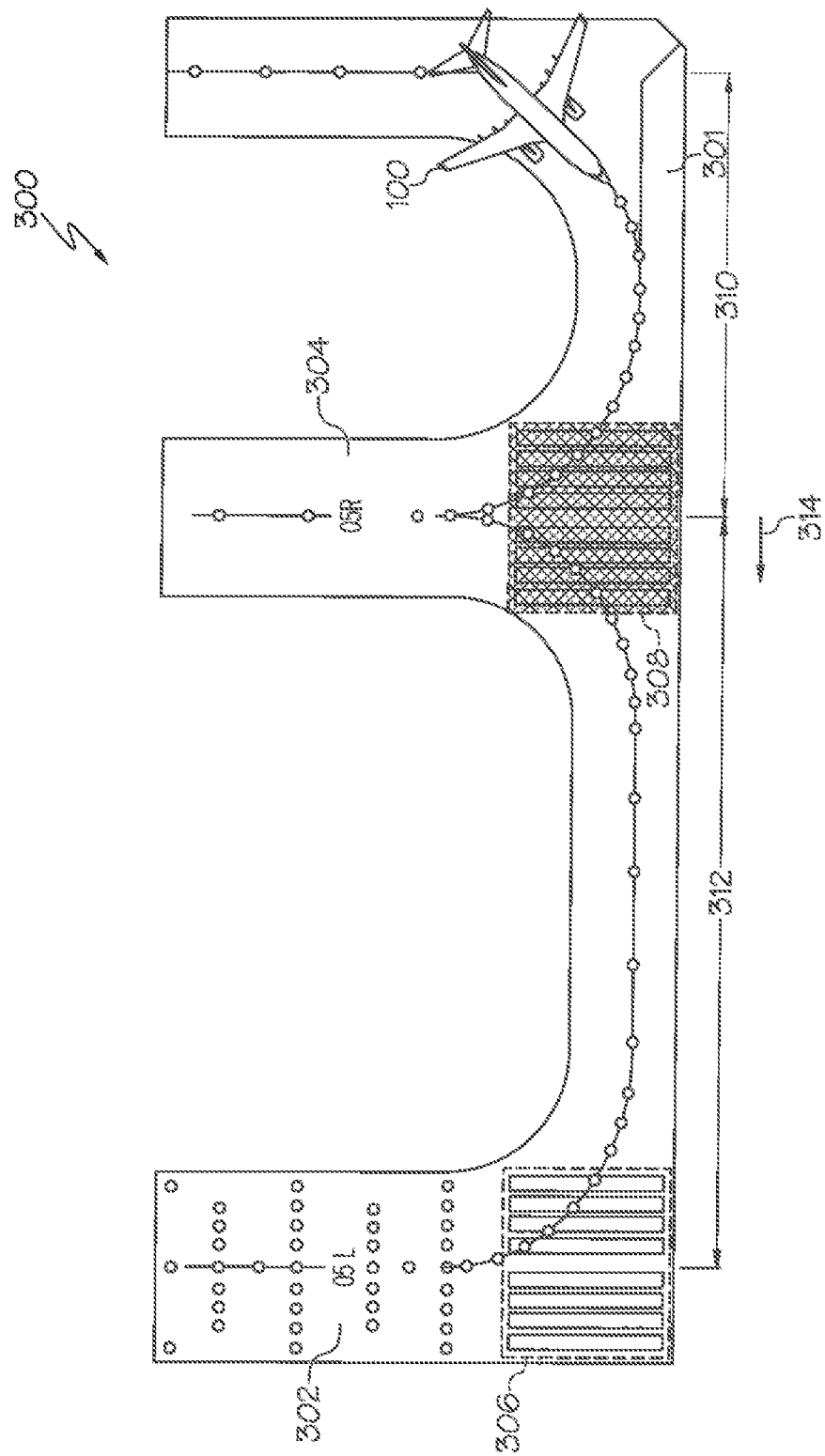
Figure 4:
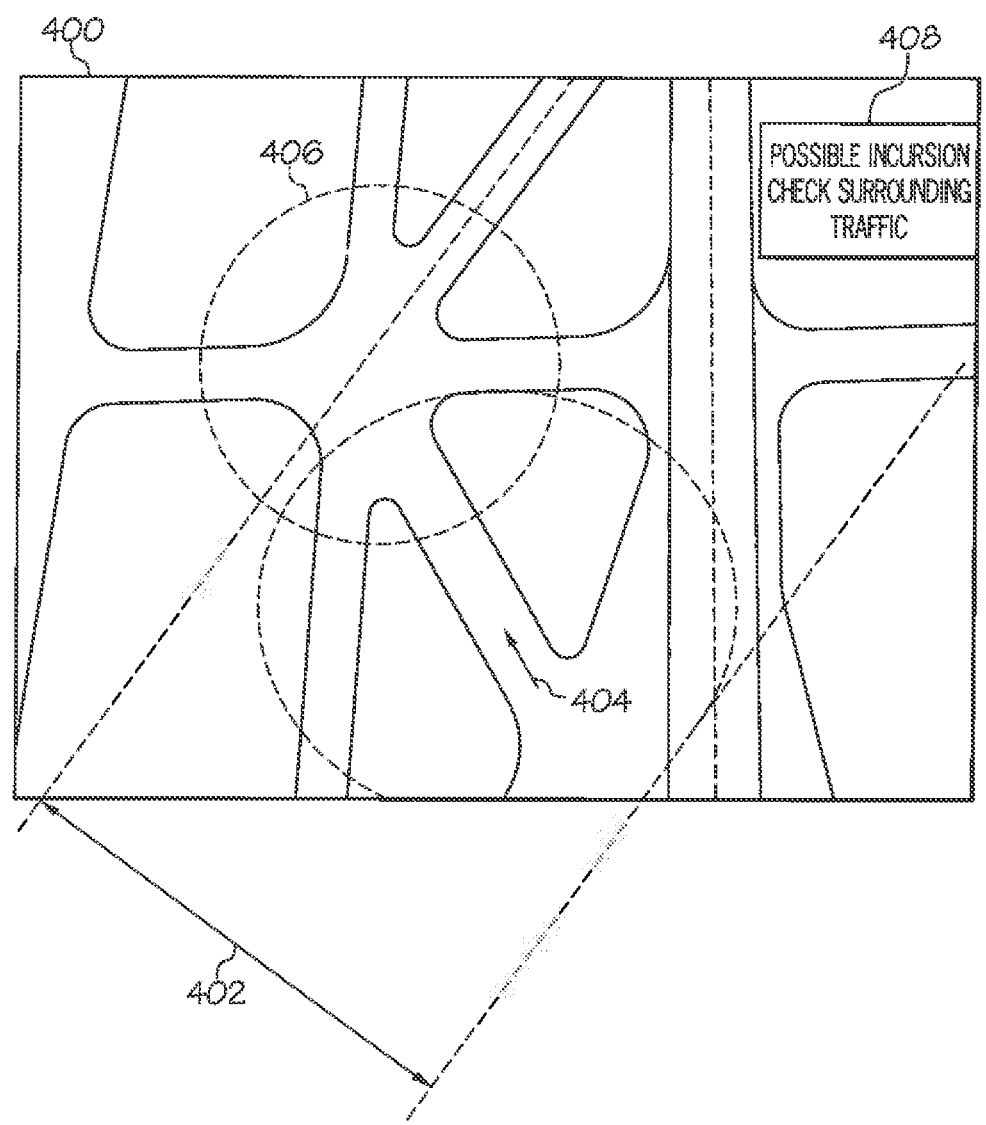

The images 22 of FIGS. 2-4 provide non-limiting examples of the provided technological enhancement over other contextual alert systems. As used herein, the "assigned runway" may also be an assigned taxiway, and the assigned runway may include information for the runway or taxi way, such as an assigned gate and an exit for the runway or taxiway. In each of the images in FIGS. 2-4, it is assumed that the control module 104 has already received the assigned runway; constructed, using airport feature data, a route for the aircraft 100 to travel from its current location to the assigned runway (the route including a travel direction); and generated display commands for rendering an image showing the aircraft 100 at the current location and heading on the airport field. The images of FIGS. 2-4 are generated by the display system 118, responsive to display commands, and are understood to be based on current aircraft state data and to be dynamically modified responsive to continuously obtaining and processing the current aircraft state data. The images in FIGS. 2-4 may also be continuously updated to reflect real-time changes with respect to terrain, airport features, weather, and neighbor traffic/relevant traffic.

Referring now to FIG. 2, image 200 shows a portion of an airport field having a portion of the constructed route, route 212. In this example, the aircraft 100 is assigned to runway 202, for example, by way of an ATC command stating the aircraft 100 is cleared for runway 202. Runway 202 is parallel to runway 204, separated by a distance 210. The control module 104 processes the route with the problematic scenario listing. In the course of this processing, the control module 104 compares the distance 210 to a threshold proximity distance, and when the distance 210 is less than the threshold proximity distance, the problematic scenario of "Two runway thresholds in close proximity" is determined present; this is identified as a design hot-spot. As a result, the control module generates a design hot-spot alert, and then generates display commands for rendering the design hot-spot alert on the image 200. As mentioned, a goal of the control module 104 is to visually distinguish identified relevant signage and hot-spot alerts with respect to the remainder of signage in the image. As may be appreciated, this may be accomplished using a variety of visually distinguishing techniques. In the example of FIG. 2, the runway sign 206 is emphasized by encircling it with a highlighting color, and the runway sign 208 is de-emphasized by shading it. As a result, when aircraft 100 travels along route 212, it will not be distracted by the runway threshold associated with runway 204.

In FIG. 3, aircraft 100 is traveling along a route 301 in a travel direction 314, to the left of the page, that includes a taxiway segment 310 and a taxiway segment 312 and passes by the runway threshold 308 for runway 304 ("05R"). The aircraft 100 is cleared for takeoff on runway 302 ("05L"). The control module 104 analyzes the route to identify relevant signage features, defined as signage features associated with the route (e.g., runway 302 "05L"); generates display commands for concurrently rendering, on the image 300, the relevant signage features with a visual emphasis that provides visual distinguishability with respect to the remaining signage features (e.g., runway 304 "05R"). In this example, when the control module 104 processes the route 301 with the problematic scenarios listing, it determines there are no problematic scenarios (i.e., the null set). In the example of FIG. 3, the runway threshold 306 is emphasized by encircling it with a highlighting color and including highlighted bands across it, and the sign for the runway threshold 308 is de-emphasized by shading it using a Bokeh technique. As a result, when aircraft 100 travels along route 301, it will not be distracted by the runway threshold associated with runway 304.

In FIG. 4, image 400 is a portion of an airport field in which a segment of the route 402 will be traveled by the aircraft 100 in the direction of the arrow 404. At area 406, multiple taxiways converge. In this example, when the control module 104 processes the route 402 with the problematic scenarios listing, it determines that area 406 triggers one or more problematic scenarios (e.g., Greater than three-node taxiway intersection and Taxiway intersects runway at other than a right angle). Responsive thereto, control module 104 identifies area 406 as a design hot-spot and generates a design hot-spot alert for it. In this example, the hot-spot alert may include concurrently displaying a highlighted circle around the intersection of taxiways in area 406 and displaying a text box 408 with an alphanumeric message, such as "possible incursion, check for surrounding traffic."

In addition to the above described scenarios, the control module 104 processes traffic data from traffic data source 54 with the constructed route to identify real-time traffic hot-spots along the route. Upon identifying a traffic hot-spot, the control module 104 generates a traffic hot-spot alert and generates display commands for the display system 118 to render the traffic hot-spot alert on the image 22. Subsequently, if the traffic hot-spot expires, such as the traffic causing congestion has cleared from the location of the traffic hot-spot, the control module 104 ceases generating the traffic hot-spot alert and the related display command. As a result, the display system 118, responsive to the display commands, ceases displaying the traffic hot-spot alert.

In addition, the control module 104 may receive a temporal problem scenario from an external source, such as NOTAM or CPDLC 52. The temporal problem scenario may be, for example: a temporary closure of a runway or taxiway, or portions thereof; using both ends of a runway for takeoff or landing; and, temporary enabling/disabling of rapid exit taxiways. The control module processes the route with the received temporal problem scenario to determine if it results in a temporal hot-spot. The control module 104 generates a temporal hot-spot alert when there is a temporal hot-spot. Subsequently, if the temporal problem scenario expires, such as the temporary closure has ended, the control module 104 ceases generating the temporal hot-spot alert and the related display command. As a result, the display system 118, responsive to the display commands, ceases displaying the temporal hot-spot alert.

Collectively, the traffic hot-spot, the design hot-spot, and the temporal hot-spot are referred to as hot-spots. Respectively, the traffic hot-spot alert, the design hot-spot alert, and the temporal hot-spot alert are referred to as hot-spot alerts. The control module 104 identifies hot-spots on the route and generates hot-spot alerts accordingly. The hot-spot alerts may comprise an icon or symbol that is small and distinctive, such that it may be placed at its location on the route in the image 22. In various embodiments, the traffic hot-spot alert, the design hot-spot alert, and the temporal hot-spot alert may each be visually distinguishable from each other. As mentioned, the hot-spot alerts may also have an associated text box, which would be displayed off-center of the route so that it does not occlude visibility of the route. The control module 104 generates display commands to render the signage and hot-spot alerts concurrently and in real-time. In this manner, the alerts and signage are contextual.

The control module 104 may use additional methods to further make the signage and alerts contextual. For example, the control module 104 may be configured to: for each hot-spot alert, the control module 104 may progressively increase and decrease its visual emphasis as a function of the current location and heading of the aircraft. In another example, for each hot-spot alert, upon determining that the temporal problem scenario has expired, the control module 104 may cease the generation of display commands for rendering it.

In some embodiments, the system 102 for contextual alerts includes a speech-to-text converter and a feature extractor 122, each operationally coupled to the control module 104. In these embodiments, the control module 104 is further configured to: receive the assigned runway embedded within a speech command from air traffic control (ATC) or from a CPDLC command; convert the speech command into text; and extract the assigned runway from the text.

Figure 5:
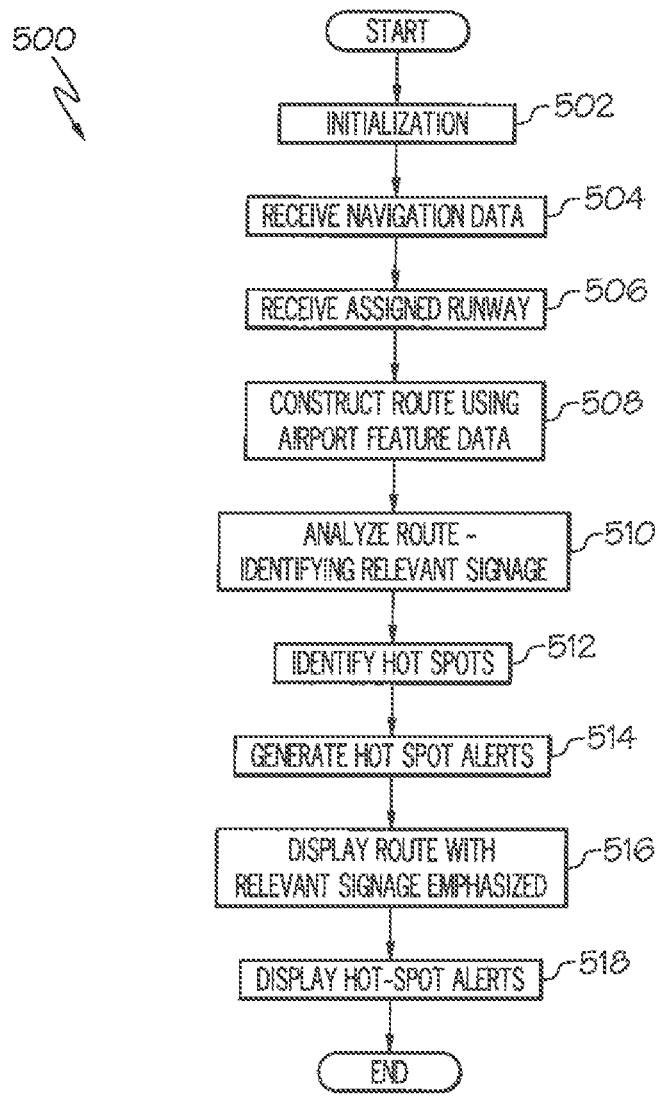
FIG. 5 is a flow chart for a method for contextual alerts, in accordance with an exemplary embodiment.

The system 102 may make its determinations and selections in accordance with a method such as method 500 of FIG. 5. With continued reference to FIGS. 1-4, a flow chart is provided for a method 500 for providing a system 102, in accordance with various exemplary embodiments. Method 500 represents various embodiments of a method for selecting an accurate runway record. For illustrative purposes, the following description of method 500 may refer to elements mentioned above in connection with FIG. 1. In practice, portions of method 500 may be performed by different components of the described system. It should be appreciated that method 500 may include any number of additional or alternative tasks, the tasks shown in FIG. 5 need not be performed in the illustrated order, and method 500 may be incorporated into a more comprehensive procedure or method having additional functionality not described in detail herein. Moreover, one or more of the tasks shown in FIG. 5 could be omitted from an embodiment of the method 500 if the intended overall functionality remains intact.

The method starts, and at 502 the control module 104 is initialized and the system 102 is in operation. Initialization may comprise uploading or updating instructions and applications 160, program 162, and various lookup tables, such as the problematic scenarios listing, stored in the database 156. Stored variables may include, for example, configurable, predetermined distances thresholds, predetermined angle thresholds, predetermined amounts of time to use as time-thresholds for neighbor traffic, parameters for setting up a user interface, and the various shapes, various colors and/or visually distinguishing techniques used for icons and alerts. In some embodiments, program 162 includes additional instructions and rules for rendering information differently based on type of display device in display system 118. Initialization at 502 may also include identifying external sources and/or external signals and the communication protocols to use with each of them.

At 504, the aircraft 100 is understood to be continually receiving and processing navigation data and referencing a prescribed flight plan (FP). At 506, an assigned runway is received. At 508, a route is constructed using the assigned runway, the airport features, and the aircraft current location and heading. At 510, the route is analyzed for relevant signage features. At 510, hot-spot analysis is performed. As mentioned, hot spot analysis may include static or physical design hot-spots, identified as design hot-spots, traffic related hot-spots, and temporal or dynamic physical hot-spots, identified as temporal hot-spots. All hot-spots may be identified concurrently. When hot-spots are identified, respective hot-spot alerts are generated at 514. The control module 104 generates display commands and the display system 118 responds to the display commands by rendering images 22 as directed in the display commands. At 516, the route is displayed with relevant signage features emphasized and remaining signage features deemphasized. At 518, hot-spots alerts are displayed. From 518, the method 500 may end or may return to 504.

Thus, technologically improved systems and methods for providing contextual alerts during ground operations are provided. As is readily appreciated, the above examples of the system 102 are non-limiting, and many others may be addressed by the control module 104.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from the set A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for contextual alerts during ground operations, comprising:
   a source of airport feature data associated with an airport field;
   a source of navigation data including a current location and heading of an aircraft;
   a source of an assigned runway;
   a problematic scenarios database comprising predefined problematic geometries and scenarios;
   a source of traffic data;
   a display device; and
   a control module operationally coupled to the source of airport feature data, the source of navigation data, the source of the assigned runway, the problematic scenarios database, the display device, and the source of traffic data, the control module configured to:
      receive the assigned runway;
      construct, using airport feature data, a route for the aircraft to travel from its current location to the assigned runway, the route including a travel direction;
      receive a temporal problem scenario from an external source;
      identify a temporal hot-spot on the route when the temporal problem scenario is on the route;

cause the display device to render an image showing the aircraft at the current location and heading on the airport field on the display system;

analyze the route to identify relevant signage features, defined as signage features associated with the route;

cause the display device to render the relevant signage features on the image with a visual emphasis that provides visual distinguishability with respect to remaining signage features in the image;

cause the display device to display a traffic hot-spot alert at a location on the route in which a traffic is currently causing congestion, while the traffic is causing congestion at the location on the route;

cause the display device to display a design hot-spot alert on the image when an area on the route includes at least one predefined problematic geometry or scenario; and cause the display device to display a temporal hot-spot alert when the temporal hot-spot is identified, wherein the traffic hot-spot alert, the design hot-spot alert, and the temporal hot-spot alert are each visually distinguishable from each other, and wherein the temporal problem scenario includes one or more of (i) a temporary closure of all or a portion of a runway or taxiway, (ii) using both ends of a runway for takeoff or landing, and (iii) temporary enabling or disabling of rapid exit taxiways.

2. The system of claim 1, wherein the control module is further configured to, for each of the relevant signage features, progressively increase and decrease its visual emphasis as a function of the current location and heading of the aircraft.

3. The system of claim 1, wherein the traffic hot-spot, the design hot-spot and the temporal hot-spot are collectively referred to as hot-spots, and wherein the control module is further configured to, for each respective hot-spot alert, progressively increase and decrease its visual emphasis as a function of the current location and heading of the aircraft.

4. The system of claim 1, wherein the control module is further configured to, for each temporal hot-spot alert, upon determining that the temporal problem scenario has expired, cease causing the display device to display the temporal hot-spot alert.

5. The system of claim 4, further comprising a speech to text converter and a feature extractor, each operationally coupled to the control module, and wherein the control module is further configured to:

receive the assigned runway embedded within a speech command from air traffic control (ATC) or a controller pilot data link communication (CPDLC);

convert the speech command into text; and extract the assigned runway from the text.

6. A method for contextual alerts during ground operations, comprising:

at a control module comprising a processor and a memory,
receiving, from a navigation system, a current location and heading for an aircraft;
receiving, from a first external source, an assigned runway;
referencing airport feature data to construct a route for the aircraft to travel from the current location to the assigned runway, the route including a travel direction;
causing a display device to render an image showing the aircraft at the current location and heading on the airport field;
analyzing the route to identify relevant signage features, defined as signage features associated with the route; and
generating display commands for concurrently rendering, on the image, the relevant signage features with a visual emphasis that provides visual distinguishability with respect to remaining signage features in the image;
causing the display device to display a traffic hot-spot alert at a location on the route in which a traffic is currently causing congestion, while the traffic is causing the congestion at the location on the route;
referencing a problematic scenarios database comprising pre-defined problematic geometries and scenarios;
causing the display device to display a design hot-spot alert on the image when an area on the route includes at least one predefined problematic geometry;
receiving a temporal problem scenario from a second external source; and
causing the display device to display a temporal hot-spot alert when the temporal problem scenario is determined to be on the route,
wherein the traffic hot-spot alert, the design hot-spot alert, and the temporal hot-spot alert are each visually distinguishable from each other, and
wherein the temporal problem scenario includes one or more of (i) a temporary closure of all or a portion of a runway or taxiway, (ii) using both ends of a runway for takeoff or landing, and (iii) temporary enabling or disabling of rapid exit taxiways.

7. The method of claim 6, further comprising, for each of the relevant signage features, progressively increasing and decreasing its visual emphasis as a function of the current location and heading of the aircraft.

8. The method of claim 6, further comprising, for each traffic hot-spot alert, design hot-spot alert, and temporal hot-spot alert, progressively increasing and decreasing its respective visual emphasis as a function of the current location and heading of the aircraft.

9. The method of claim 8, further comprising, ceasing the display of the temporal hot-spot alert upon determining that the temporal problem scenario has expired.

10. The method of claim 9, further comprising:
receiving the assigned runway embedded within a speech command from air traffic control (ATC);
converting the speech command into text; and
extracting the assigned runway from the text.

11. A control module for an aircraft during ground operations, the aircraft comprising a source of navigation data including a current location and heading of an aircraft, and a source of airport feature data associated with an airport field, and the control module comprising:

a memory;
a database including a problematic scenarios listing of pre-defined problematic geometries and scenarios; and
a processor operationally coupled to the memory and the database, the processor configured to:
receive an assigned runway;
construct, using airport feature data, a route for the aircraft to travel from its current location to the assigned runway, the route including a travel direction;
receive a temporal problem scenario from an external source;
identify a temporal hot-spot on the route when the temporal problem scenario is on the route;

cause a display device to render an image showing the aircraft at the current location and heading on the airport field;

analyze the route to identify relevant signage features, defined as signage features associated with the route;

cause the display device to render on the image, the relevant signage features with a visual emphasis that provides visual distinguishability with respect to remaining signage features;

cause the display device to display a traffic hot-spot alert at a location on the route in which a traffic is currently causing congestion, while the traffic is causing congestion at the location on the route; and cause the display device to display a design hot-spot alert on the image when an area on the route includes at least one predefined problematic geometry or scenario; and cause the display device to display a temporal hot-spot alert when the temporal hot-spot is identified, wherein the traffic hot-spot alert, the design hot-spot alert, and the temporal hot-spot alert are each visually distinguishable from each other, and wherein the temporal problem scenario includes one or more of (i) a temporary closure of all or a portion of a runway or taxiway, (ii) using both ends of a runway for takeoff or landing, and (iii) temporary enabling or disabling of rapid exit taxiways.

12. The control module of claim 11, wherein the processor is further configured to, for each of the relevant signage features, progressively increase and decrease its visual emphasis as a function of the current location and heading of the aircraft.

13. The control module of claim 11, wherein the processor is further configured to, for each traffic hot-spot alert, design hot-spot alert, and temporal hot-spot alert, progressively increase and decrease its respective visual emphasis as a function of the current location and heading of the aircraft; and upon determining that the temporal problem scenario has expired, cease rendering the temporal hot-spot alert.

* * * * *